US006993762B1

(12) United States Patent
Pierre

(10) Patent No.: US 6,993,762 B1
(45) Date of Patent: Jan. 31, 2006

(54) PROCESS FOR IMPROVING THE PERFORMANCE OF A MULTIPROCESSOR SYSTEM COMPRISING A JOB QUEUE AND SYSTEM ARCHITECTURE FOR IMPLEMENTING THE PROCESS

(75) Inventor: Rogier Pierre, Grenoble (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/545,493

(22) Filed: Apr. 7, 2000

(30) Foreign Application Priority Data

Apr. 7, 1999  (FR) .................................. 99 04337

(51) Int. Cl.
*G06F 9/46* (2006.01)
(52) U.S. Cl. ...................... 718/102; 718/100; 718/101; 718/102; 718/103; 718/104
(58) Field of Classification Search ................ 709/100, 709/103, 104; 718/100–104
See application file for complete search history.

(56) References Cited

U.S. PATENT DOCUMENTS

| 4,462,075 | A | * | 7/1984 | Mori et al. ................... 709/202 |
| 5,214,652 | A | * | 5/1993 | Sutton .......................... 714/10 |
| 5,459,864 | A | | 10/1995 | Brent et al. |
| 5,854,938 | A | * | 12/1998 | Ogi ............................. 712/30 |
| 6,105,053 | A | * | 8/2000 | Kimmel et al. .............. 718/105 |
| 6,148,361 | A | * | 11/2000 | Carpenter et al. ........... 710/260 |

FOREIGN PATENT DOCUMENTS

| EP | 0 750 255 | A | 12/1996 |
| FR | 2 740 579 | A | 4/1997 |

OTHER PUBLICATIONS

Microsoft Computer Dictionary 5$^{th}$ edition 2002 p. 285.*
Benmohammed-Mahieddine K et al. "A Periodic Symmetrically-Intitiated Load Balancing Algorithm for Distributed Systems" Operating Systems Review (SIGOPS), US, ACM, HO, N vol. 28, No. 1, Jan. 1994, p. 66-79 XP000418067 p. 69, par. 2.3-p. 70; fig. 2.

* cited by examiner

*Primary Examiner*—Thomas Lee
*Assistant Examiner*—Nilesh Shah
(74) *Attorney, Agent, or Firm*—Miles & Stockbridge P.C.; Edward J. Kondracki

(57) ABSTRACT

The invention relates to a process for assigning tasks in a multiprocessor digital data processing system having a preemptive operating system, and an architecture for implementing the process. The system comprises processors (200–203, 210–213) capable of processing the tasks in parallel, divided into groups (200–201, 202–203). An elementary queue (5a, 5b) is associated with each of the processor groups (200–201, 202–203) and stores tasks to be executed. All the tasks to be executed (T1 through T10) are stored in a table (4). Each of the tasks (T1 through T10) of the table (4) is associated with one of the queues (5a, 5b) and each of the tasks stored in the queues (5a, 5b) is associated with one of the processors (200 through 201). The associations are made by sets of cross pointers (p200 through p203, pp5a, pp5b, pT1, pT5, pT10, p5a1 through p5a4, and p5b1 through p5b10). In an additional embodiment, according to several variants, a (re-)balancing of the load of the system among elementary queues is performed.

26 Claims, 5 Drawing Sheets

PROCESS FOR IMPROVING THE PERFORMANCE OF A MULTIPROCESSOR SYSTEM COMPRISING A JOB QUEUE AND SYSTEM ARCHITECTURE FOR IMPLEMENTING THE PROCESS

BACKGROUND OF THE INVENTION

1. Field of the Invention

The invention relates to a process for improving the performance of a multiprocessor data processing system comprising a job queue and controlled by an operating system of the preemptive type.

The invention particularly relates to a process for the optimized assignment of tasks to a processor in a multiprocessor system of this type so as to obtain said improvement in performance.

The invention also relates to a data processing system architecture for implementing this process.

The invention particularly applies to conventional symmetric multiprocessor systems of the type known as "SMP." However, it also applies to multiprocessor systems with a nonuniform memory access architecture, known by the name "NUMA."

Even more particularly, the invention applies to an operating system environment of the "UNIX" (registered trademark) type. But it must be clearly understood that the process of the invention also applies to other operating systems of the preemptive type. However, to illustrate the concept without in any way limiting the scope of the invention, the following will keep to the case of the "UNIX" environment and to the framework of the above-mentioned "NUMA" type of architecture, unless otherwise indicated.

2. Description of Related Art

One of the essential functions of a preemptive operating system is to allocate processor time to each of the various tasks being executed in parallel in the system.

In the prior art, a standard solution for solving this problem consists of storing in a queue the tasks that must be executed, and each processor draws from this queue in order to execute a task, until a predetermined event indicates to the processor in question that it should execute another task. The processor then sends a request, which is transmitted to a distributing device, commonly called a "dispatcher."

This solution has the advantage of ensuring that a processor is only inactive if the queue is empty, i.e., if there is currently no task that can be executed.

On the other hand, this solution has several drawbacks, including the following:

when the number of processors and the number of tasks to be processed increase, contention in devices known as locks, i.e., devices that protect access to the above-mentioned queue, increases to a substantial degree; and so-called "level 2" caches are sometimes associated with each processor; it is therefore advantageously preferable for a task to be executed in only one processor, in order to benefit from the information stored in the "level 2" cache associated with it.

The above-mentioned standard solution is incapable of handling such an operation naturally. Thus, it is also known to use additional algorithms that allow this mode of operation. However, these algorithms are not without drawbacks, either. They become increasingly costly in terms of the degradation of the global performance of the system as the number of tasks and/or the number of processors increases.

SUMMARY OF THE INVENTION

The object of the invention is to eliminate the drawbacks of the processes and devices of the prior art, some of which have been mentioned.

The subject of the invention is a process for improving the mechanism for assigning tasks to a processor in a multiprocessor system with an operating system of the preemptive type.

To this end, according to a first important characteristic, in a first embodiment, the process according to the invention comprises steps that consist of partitioning the one above-mentioned job queue into a predetermined number of queues that will be described as elementary, of assigning each of the jobs to be performed to one of the elementary queues, of dividing the processors of the system into processor groups, the number of processor groups being equal to the number of queues, and of assigning each of the processor groups to one of the elementary queues.

This arrangement specifically makes it possible to limit the number of processors accessing the locks, thereby limiting the contention phenomenon.

However, experience has shown that when the number of tasks and the number of processors increase, the above-mentioned arrangement no longer makes it possible to improve the performance of the system.

This is due to several phenomena, particularly the following:

In a modern operating system, there are two types of tasks: tasks of variable priority and tasks of fixed priority. Tasks of the first type are tasks whose priority varies as a function of the processor time consumed (the scheduling policy is defined by the operating system itself). Tasks of the second type are tasks for which the scheduling policy is set during the definition of the task by the programmer.

First of all, the management of tasks of fixed priority in a system comprising several queues, according to a first characteristic of the first embodiment of the invention, can become complex, since it is necessary to prevent a first task of higher priority from being executed after a second task of lower priority. This management proves to be difficult, and above all time-consuming, when the two aforementioned tasks are in two separate queues. It is easy to understand that this difficulty quickly increases along with the number of tasks, which are distributed into a large number of queues.

The problem also exists for tasks of variable priority, but the implementation is less difficult since the operating system itself sets the priorities, and it can allow itself to break its own rules.

Secondly, the processing of the tasks can become unbalanced. The tasks being, a priori, heterogeneous in nature, the time required to process them can vary to a large degree from one task to another. The result is that one or more processors, or processor groups can be underloaded, or even become inactive for want of tasks to process (the associated queues being empty), while one or more other processors or processor groups continue to process tasks (or even be overloaded), and while there are still tasks to be processed in the queues associated with the latter.

Also, in a second preferred embodiment of the invention, while retaining the arrangements specific to the first embodiment (partitioning of the queues), a re-balancing of the processing of the tasks is performed, in accordance with several variants.

According to a first variant, the re-balancing comprises an optimized distribution of the tasks among the various queues of the system. The distribution method takes into account various parameters, which are indicated below. The distribution can be done either during the creation of the task, or during the establishment of the association between the task and a queue containing the program to be executed.

For example, in an environment of the above-mentioned "UNIX" type, this association is made by an instruction of the "exec( )" type. This second option is preferable when the multiprocessor system is of the above-mentioned "NUMA" type.

This arrangement improves the performance of the system, even when the number of tasks to be processed is very high. However, the curve representing the performance has oscillations, which reflect instabilities, particularly when the number of tasks becomes high. However, it is possible to further improve the performance.

According to a second variant of embodiment, when the queue associated with a processor, or with a processor group, becomes empty and the processor or at least one of the processors no longer has any tasks currently being processed, the processor searches in the other queues to see if there are any tasks waiting to be processed. If this search is positive, in a preferred embodiment, the processor searches for what could be called the "best task to process," if there are several tasks waiting. The method for searching for and selecting this task will be explained below.

It must be clearly understood that in these two variants, the assignment of the various tasks to the various queues remains unchanged. The association of the above-mentioned first and second variants is particularly effective in improving the performance of the system as long as new tasks are continuously created. On the other hand, when this state ends, for example at the system's end-of-job, load imbalances may again be observed.

Also, the invention can comprise a third variant of embodiment in which tasks are reassigned to different queues, for example periodically.

This arrangement generally has little effect during normal operation (continuous creation of tasks) on the performance of a symmetrical multiprocessor system, i.e., of the above-mentioned "SMP" type. It can, however, prove useful for a system of the above-mentioned "NUMA" type.

Hence, the subject of the invention is a process for assigning tasks in a multiprocessor digital data processing system with a preemptive operating system, comprising a given number of processors capable of processing said tasks in parallel, characterized in that it comprises at least one preliminary phase during which said processors are divided into groups, each group comprising predetermined numbers of processors, in that each of said processor groups is associated with an elementary queue storing a predetermined number of tasks to be processed in a given order of priority, and in that each of the tasks of each of said queues is associated with one of the processors associated with this elementary queue.

Another subject of the invention is a multiprocessor system architecture for implementing this process.

BRIEF DESCRIPTION OF THE DRAWINGS

The invention will now be described in greater detail in reference to the attached drawings, in which.

The following, without in any way limiting the scope of the invention, will relate to an operating system environment of the "UNIX" type. The tasks will therefore be constituted, as indicated above, by "threads."

In the example described, a table 4 is provided, which stores the list of all the tasks to be processed, or m tasks T1 through Tm a processor sends a request to a task distribution device 3, or "dispatcher," and a single queue 5, or "run queue," constituted by a list of tasks stored in a pre-established order of priority. The structure is generally of the "first-in-first-out" or "FIFO" type.

Generally, a "queue" set (hereinafter called queue set) is constituted by a series of objects and methods required to process the queue. It comprises:

the processor belonging to the queue set and represented by a data structure which, in the system in which the invention is implemented, is called "ppda" (for "Per-Processor Data Area").

the tasks belonging to the queue set, each task being represented by a task structure;

the structure of the queue;

the methods that make it possible to add or remove tasks from the queue; and the methods for initializing the queue.

A processor is referred to the structure of the queue by a pointer that addresses the above-mentioned data structure "ppda structure." A task is referred to the task structure by a pointer. The queue structure usually comprises a certain amount of data or information relative to the dispatcher (lock, priority table, list of the processors, etc.).

A task can be in either of two main states: a first so-called "executable" state, in which it is capable of being effectively processed, and a second, so-called "dormant" state, i.e., waiting for an event to change it to the first state. When a task changes from one state to another, the kernel of the operating system uses the queue pointer to add or remove the task in question from the list of executable tasks in the queue structure. The task with the highest priority is executed by one of the processors 20 through 2n, which has sent a processing request (n being the total number of processors in the system 1).

DETAILED DESCRIPTION OF THE EMBODIMENT(S) OF THE INVENTION

Figure 1:
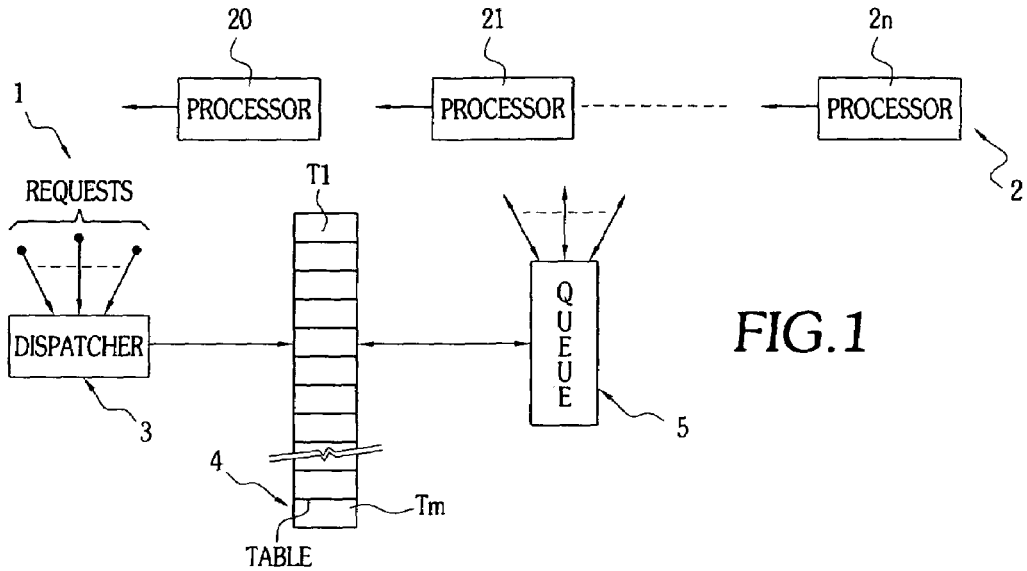
FIG. 1 schematically illustrates the distribution of tasks among the processors in multiprocessor system architecture according to the prior art.

FIG. 1 schematically illustrates a multiprocessor system architecture and the main devices used in the task distribution mechanism according to the prior art.

FIG. 1 represents only the elements necessary to the proper understanding of this mechanism. It is assumed that the multiprocessor system 1 comprises a set 2 of n processors, referenced 20 through 2n.

A so-called "lock" mechanism is used in a certain number of circumstances, in order to avoid concurrent access to a task, particularly when a task is added or removed from the queue 5, or when its status changes.

It is easy to see that this global lock mechanism generates contentions when it is frequently used, and allows very little scalability. This drawback is amplified when the multiprocessor system is the above-mentioned "NUMA" type.

Thus, according to an important characteristic of the invention, a first embodiment provides for a partitioning of the single queue, of and the locks associated with it, into several queue-and-lock sets.

Figure 2:
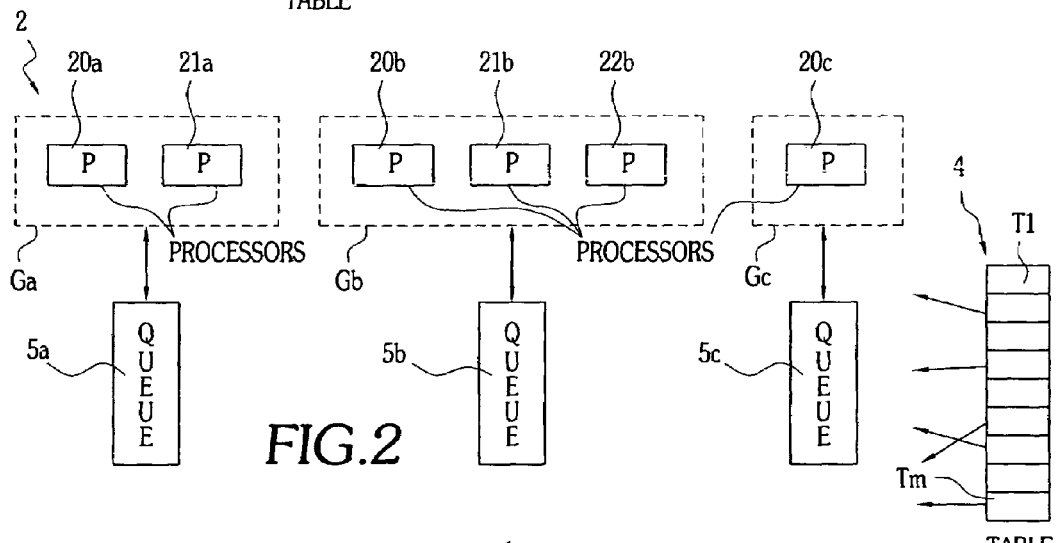
FIG. 2 illustrates an exemplary architecture comprising several queues, according to a first embodiment of the process of the invention.

FIG. 2 schematically illustrates an exemplary architecture of this type. The system 1, as before, comprises several processors. However, these processors have been organized into processor groups, for example three groups referenced Ga through Gc. Each group, Ga through Gc, may or may not comprise an identical number of processors. In FIG. 2, for example, it has arbitrarily been assumed that the group Ga comprises two processors 20a and 21a, the group Gb, three processors 20b through 22b, and the group Gc, only one processor 20c.

Moreover, according to a first important characteristic of the invention the single queue (FIGS. 1: 5) is then divided into a plurality of queues. More precisely, the number of queues is equal to the number of processor groups, or three queues in the example of FIGS. 2: 5a through 5c, each queue being associated with one of the processor groups Ga through Gc.

Furthermore, according to another important aspect, each task T1 through Tm, is assigned to one particular queue 5a through 5c only.

Figure 4:
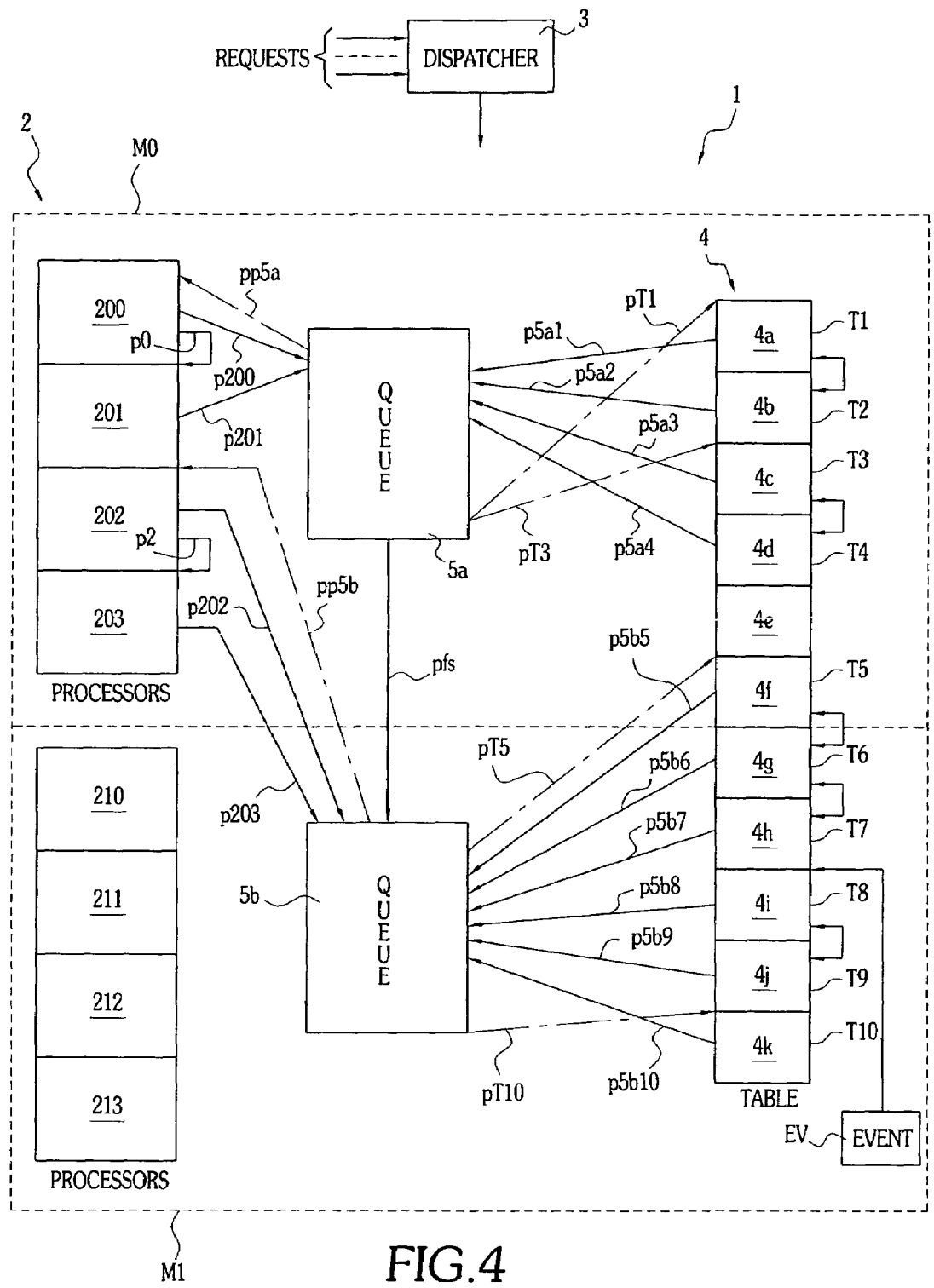
FIG. 4 illustrates in greater detail the architecture of FIG. 2, in the case of a multiprocessor system of the "NUMA" type according to FIG. 3.

These assignments and associations, as shown below in connection with FIG. 4, are made by means of sets of pointers.

The choice of the number of processor groups, and hence of the number of elementary queues, depends on various parameters in a multiprocessor system with given characteristics. Generally, this distribution cannot be obtained through prior calculations, but through testing and measurement.

The object of the invention is to increase the global performance of the system through a better distribution of the tasks among individual processors. Also, the aforementioned experimentation and measurement consist, in an initial phase, of defining testing and reference programs known as "benchmarks," and of having them run by the system. The distribution of the processors into groups associated with elementary queues that provides the best results from the point of view of performance is chosen at this stage. The configuration obtained is generally "fixed" and used for systems with the same structure produced subsequently.

It should be presumed, a priori, that the best performance is achieved by associating a queue with each of the processors. In other words, each group is reduced to a single processor. But this distribution can cause implementation problems. Thus, a compromise is generally preferred.

This first embodiment of the process for distributing tasks according to the invention will now be described in greater detail.

Figure 3:
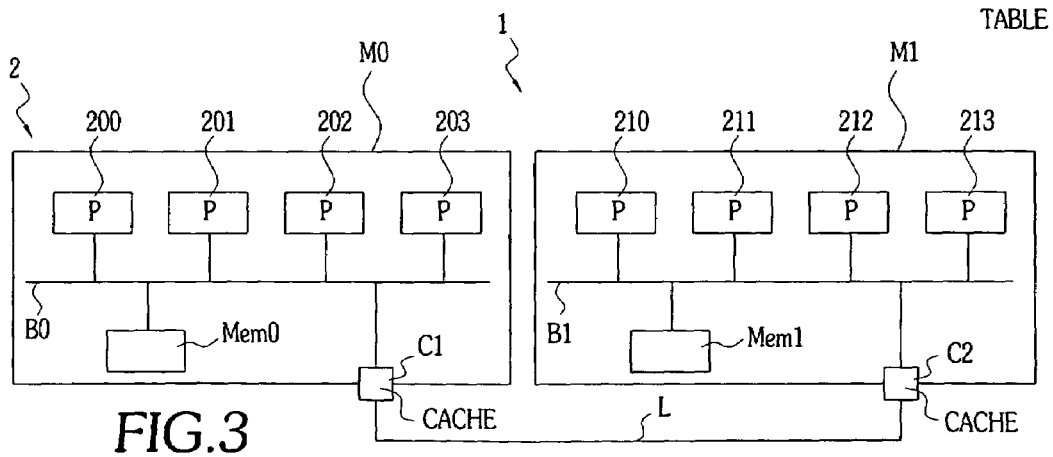
FIG. 3 schematically illustrates an exemplary multiprocessor system architecture of the so-called "NUMA" type.

However, since as indicated above, the architectures of multiprocessor systems of the "NUMA" type accentuate the problems, let us consider this framework and briefly summarize the main characteristics of such an architecture in reference to FIG. 3.

The system 1 is divided into modules, for example two modules M0 and M1 as represented in FIG. 3 (which number could be any number). Each module M0 and M1 comprises any number of processors that can operate in parallel. In practice, the number of processors is limited to a few units, typically four: 200 to 203 and 210 to 213, respectively. In essence, when the number of parallel processors increases, the global performance of the system initially increases in a substantially linear fashion, after which the curve dips. The aforementioned number four generally represents an optimal value. The processors of each module M0 and M1 are connected to internal busses in the modules B0 and B1, respectively, and each module specifically comprises an internal memory Mem0 and Mem1. The modules M0 and M1 and their associated memories Mem0 and Mem1 each form a subsystem of the above-mentioned "SMP" type. The modules M0 and M1 are linked to one another by a link L and a system of caches C1 and C2, which constitute an extension of the aforementioned internal busses.

It is easy to see that, for example, the reading or writing of a datum from or into a memory outside a module by a processor of this module, translates into a degradation of the performance of the system, as compared to having the same operation executed entirely within the same module. Performance is also degraded when the data must pass from one module to the other through the link, which generally cannot operate at the same speed as an internal bus.

Other processes that make it possible to obviate all or some of the specific problems posed by architectures of the "NUMA" type, which processes are beyond the precise scope of the invention, have been proposed.

However, the process of the invention, in its first embodiment, since it makes it possible to limit contentions because of the partitioning of the queues and the associated locks, has a particularly advantageous application to this type of architecture.

FIG. 4 illustrates in greater detail an exemplary architecture of the "NUMA" type in which the process of the invention is implemented. Only the elements strictly necessary to a proper understanding of the invention are represented. The elements common to the preceding figures have the same references and will be re-described only as necessary. As before, it is assumed that the multiprocessor system 1 comprises only two modules M0 and M1, each comprising the same number of processors, i.e., four processors: 200 to 203 and 210 to 213, respectively. Naturally, there could be any number of modules.

Within the scope of a "NUMA" architecture, there is a natural partitioning of the processors of the system 1 into groups, in this case a distribution into modules (two modules in the example of FIG. 4: M0 and M1). A queue could be associated with each module. However, this configuration is not mandatory.

In FIG. 4, for example, a different configuration is represented. Although two queues 5a and 5b are provided, one per module M0 and M1, the processors 200 and 201 of the module M0 are associated with the queue 5a, and the processors 202 and 203 of the module M, with the queue 5b.

The operation of the processors 210 through 213 of the module M, is not described below. These processors could also be associated, for example, with the queue 5b.

The system 1 also comprises, as before, a table of the tasks to be executed 4 and a task dispatcher 3 that receives requests sent by the processors 2. More precisely, to illustrate the concepts, it has been assumed that the table 4 has eleven positions, referenced 4a through 4k. Each position is intended to store an elementary task. Certain positions can be blank at a given instant, like the position 4e in the example of FIG. 4, so that there are only ten tasks waiting to be executed, T1 through T10. The tasks T1 through T4 are stored in the positions 4a through 4d of the table 4, and the tasks T5 through T10 are stored in the positions 4f through 4k. As indicated, certain tasks may be "dormant." In FIG. 4, for example, two "dormant" tasks T8 through T9 are represented, stored in the positions 4i and 4j, respectively. These last two tasks are said to be "anchored," since they are waiting for the occurrence of an event referenced EV in FIG. 4, an event that will change them to the "executable" state.

As indicated, each processor is associated with a data structure "ppda" that identifies it. These data structures comprise at least two series of pointers.

The first series of pointers (represented in solid lines) associates a queue with each processor. In the example of FIG. 4, the pointers referenced p200 and p201 associate the queue 5a with the processors 200 and 201, and the pointers referenced p202 and p203 associate the queue 5b with the processors 202 and 203.

The second series of pointers (represented in solid lines) link together the cascade of processors associated with the same queue. These pointers could be named "next processor in the queue." The pointer referenced p0 indicates that the next processor linked to the queue 5a, after the processor 200, is the processor 201. The pointer referenced p1 indicates that the next processor linked to the queue 5b, after the processor 202, is the processor 203.

Likewise, the data structures associated with the queues comprise several series of descriptors, constituted by pointers.

A first series of pointers (represented in dot-and-dash lines), pp5a and pp5b, associate each queue 5a and 5b, with a processor group, more precisely with the first processor in this group, identified by its data structure "ppda". In the example of FIG. 4, the pointer pp5a associates the queue 5a with the processor 200. The pointer pp5b associates the queue 5b with the processor 202.

There is a second series of pointers, in the example only one, referenced pfs (represented in solid lines), pointing to the next queue, in this case the queue 5b.

Finally, there is a third series of pointers (represented in dot-and-dash lines), pT1, pT3, pT5 and pT10, each pointing to one of the tasks in the table 4, more precisely to the first task in a sequenced cascade of tasks, as shown below. In the example of FIG. 4, pT1 and pT3 respectively associate the tasks T1 and T3, with the queue 5a, and pT5 and pT10 respectively associate the tasks T5 and T10 with the queue 5b.

In the table 4, the tasks are sequenced in order of priority. The structure describing each task comprises at least three series of data constituted by pointers. For each task, the pointer of the first series makes it possible to know the previous task and the pointer of the second series makes it possible to know the next task. These pointers (represented in solid lines) have purposely not been referenced, and are symbolized in FIG. 4 by double arrows.

According to an important aspect of the process of the invention, each task, including the so-called "dormant" tasks, is associated with one of the queues 5a or 5b, in the example of FIG. 4. This association is established by means of a third series of pointers (represented in solid lines), referenced p5a1 through p5a4, and p5b5 through p5b10, respectively. The pointers p5a1 through p5a4 associate the respective tasks T1 through T4 with the queue 5a, and the pointers p5b5 through p5b10 associate the respective tasks T5 through T10 with the queue 5b.

In the precise example described in FIG. 4, there are two distinct "packets" of cascaded tasks for each of the queues, respectively 5a and 5b: T1–T2 and T3–T4 for the queue 5a, and T5–T7 and T10 for the queue 5b. The tasks T8 and T9 are linked to one another, but are in the "dormant" state. There is no pointer associating these tasks with the queue 5b in this state.

As noted, there are tasks of fixed priority and tasks of variable priority. For tasks of the first type, it is mandatory for the order of the priorities to be followed, and the highest priority tasks must be handled before the others. To do this, it is possible to reserve a queue for the tasks of fixed priority. However, this arrangement is not always possible. That is the case, for example, when a process comprises tasks linked to a given processor. The task must then reside in the queue associated with this processor or with the group to which it belongs. The order of the priorities is handled in this queue.

To summarize what has just been described, the process according to the invention, in the first embodiment that consists of increasing the number of queues, assigning each queue to a processor group and assigning each task to a queue, clearly makes it possible to improve the global performance of the system. Contention is in fact reduced, since the locks are also distributed.

Furthermore, the process makes it possible, in an architecture of the "NUMA" type, to install a so-called "weak affinity" mechanism. Such a mechanism favors the execution of a task in a processor of only one module, making it possible to take better advantage of the so-called "level 3" cache memory associated with the module. Since it is possible to associate a queue with processors belonging to only one module, the dispatcher can easily confine the tasks of a process to just one module.

The process according to the first embodiment has limits, however, when the numbers of tasks and processor groups increase substantially. In fact, during the "physical" creation of a task, the latter must be assigned to one of the queues of the system, using a given distribution mechanism. Up to this point, it has implicitly been assumed that the distribution of the tasks is performed on the basis of equal time distribution among the various queues, as long as they are not full. To do this, it is possible to use a well-known algorithm of the "round-robin" type. Such a method is not without its drawbacks. In fact, under the aforementioned conditions, since the tasks have non-homogeneous characteristics, particularly in terms of the necessary processing time, one or more queues can be empty or underloaded, and hence the processors of the groups associated with them can be underloaded, or even inactive, at least until the appearance of new tasks and their assignment to these queues. Conversely, one or more other queues can be substantially overloaded. Thus, a load imbalance phenomenon occurs, and has an even greater chance of occurring if the number of queues and the number of tasks to be processed are high. The expected increase in the global performance of the system is therefore counterbalanced by this parasitic phenomenon. In certain especially unfavorable cases, above a given workload threshold, a threshold that depends on the resources specific to a particular system, the arrangements of the process of the invention may be observed to be counterproductive, in the sense that the performance of the system is worse than that of a system of the prior art having the same computer resources.

Also, according to a second embodiment, a preferred embodiment capable of several variants, additional arrangements are adopted, allowing a (re-)balancing of the load among the various queues, or at least an optimized processing of the tasks distributed into the queues, so that the processors are used in optimal fashion. It must be clearly understood, however, that according to this second embodiment, in all of its variants, the arrangements specific to the first embodiment are retained. In particular, the processors are distributed into groups (which can coincide with a distribution into modules in a system with a "NUMA" type of architecture) and several queues are provided, one per processor group.

The operations required to obtain this multiple queue configuration, generally performed only once, constitute a phase that could be described as preliminary. In the operating mode, a (re-)balancing of the tasks among queues or of the workload among processors is obtained by means of three mechanisms, which specifically constitute three variants of the second embodiment. It must be noted that these three mechanisms can coexist and are not mutually exclusive. On the contrary, in a preferred embodiment, these three mechanisms, or at least the first two, which produce the best results in terms of the objectives pursued by the invention, are combined, as will be explained below.

According to the first variant of embodiment, a balancing of the tasks is obtained by distributing them in optimized fashion among the various queues as they "physically" appear, and not simply in the above-mentioned "round robin" fashion. The precise method for choosing a queue will be explained below.

According to the second variant of embodiment, a re-balancing of the processing of the if [CLP−AD]<[AD], finding the queue with the arbitrary subscript y for which the parameter [CLP−AD] is minimal;

migrating this process to the queue set with the lightest load 5y;

updating the factor representing the imbalance of the two queue sets, i.e., $[AD_x]=[AD_x]-[CLP_x]$ and $[AD_y]=[AD_y]-[CLP_y]$.

The composite load vector is a three-dimensional vector. In essence, it depends on the following parameters:

load of the processor;

load of the memory; and priority.

The first two parameters in turn depend on the precise hardware and software configuration of the system in question: number of processors, size of the memory, number of available pages, etc. The determination of these parameters is common to the prior art and obtained through standard calculations, well known to one skilled in the art. The "priority" parameter is obtained from the average of the priorities attached to the various tasks.

Theoretically, the determination of the load of a queue set is given by the sum of the loads of the processes. But to accelerate this determination, it is derived directly from statistics generally stored in the data structure of this set. Again, the load depends on three parameters: load of the processor, load of the memory, and priority.

The determination of the average composite load can be obtained from the following relation:

$$\vec{ACL} = \frac{\sum_{i=1 \grave{a} p} \vec{CL_i}}{p} \quad (3)$$

a relation wherein [ ] is the composite $i^{th}$ queue set and p is the total number of queue sets.

The average imbalance can be determined from the following relation:

$$\vec{AD_i} = \frac{\vec{AD_i} + (\vec{CL_i} - \vec{ACL_i})}{2} \quad (4)$$

The determination of the cost associated with a migration operation can be obtained by considering that the chief cost is due to the migration of pages in an environment of the "UNIX" type (or to access to remote pages), and to the cost linked to the movement of a task from one tasks is obtained by optimizing the effective utilization of the processors. When a processor detects that the queue associated with it is empty and that it has no more current tasks, it searches for a task to process in another, so-called "remote" queue, by performing a scan of the other queues of the system until it finds a queue that is not empty and that has a load greater, a priori, than a given threshold. The choice of a specific task in the selected queue is made using a process that will be described in detail below. In practice, it is the "dispatcher" that controls these operations and assigns the chosen task, based on pre-established criteria, to the requesting processor. This process can be described as "stealing processor time" (the computer resource constituted by this processor is actually temporarily reassigned to a remote queue with which it is not associated) or "aiding other components of the system."

In the two above variants, a given task, even if it is assigned a relationship with a processor foreign to its queue, remains associated with this queue. When the aforementioned processor has finished its operation, the task is returned to its initial queue (and not to that of the processor that performed the operation).

In the third variant, on the other hand, when an imbalance is detected at the global level of the system, queues are re-balanced. To do this, tasks are reassigned by being physically moved from one queue to another. This re-balancing can be performed on a regular basis, for example every second, under the control of a device called a "scheduler," a device that is standard in computer systems. In practice, in this third variant, not all the queues are systematically re-balanced. Thresholds are also used, which are determined as explained below.

These three variants of the second embodiment, especially the first two, make it possible to increase the performance of the system even when the number of tasks and the number of processor groups (and therefore queues) are high.

The three variants of the second embodiment will now be described in detail.

According to the first variant of embodiment, when a task to be executed is created, it is assigned to one of the queues of the system so as to optimize the global load of the system.

Figure 5A:
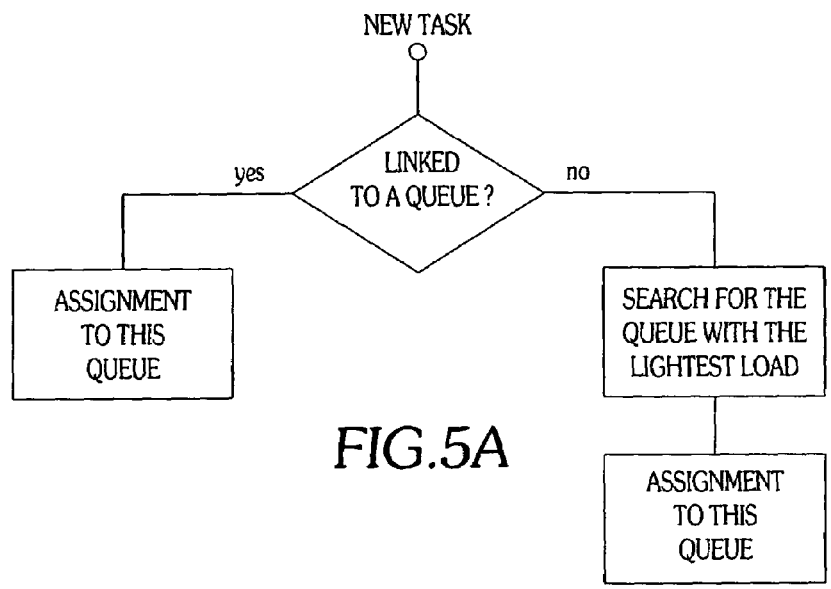
FIG. 5A is a flow chart explaining the process of the invention according to a first variant of a second embodiment of the process of the invention and FIG. 5B schematically illustrates an architecture for implementing this variant.
Figure 5B:
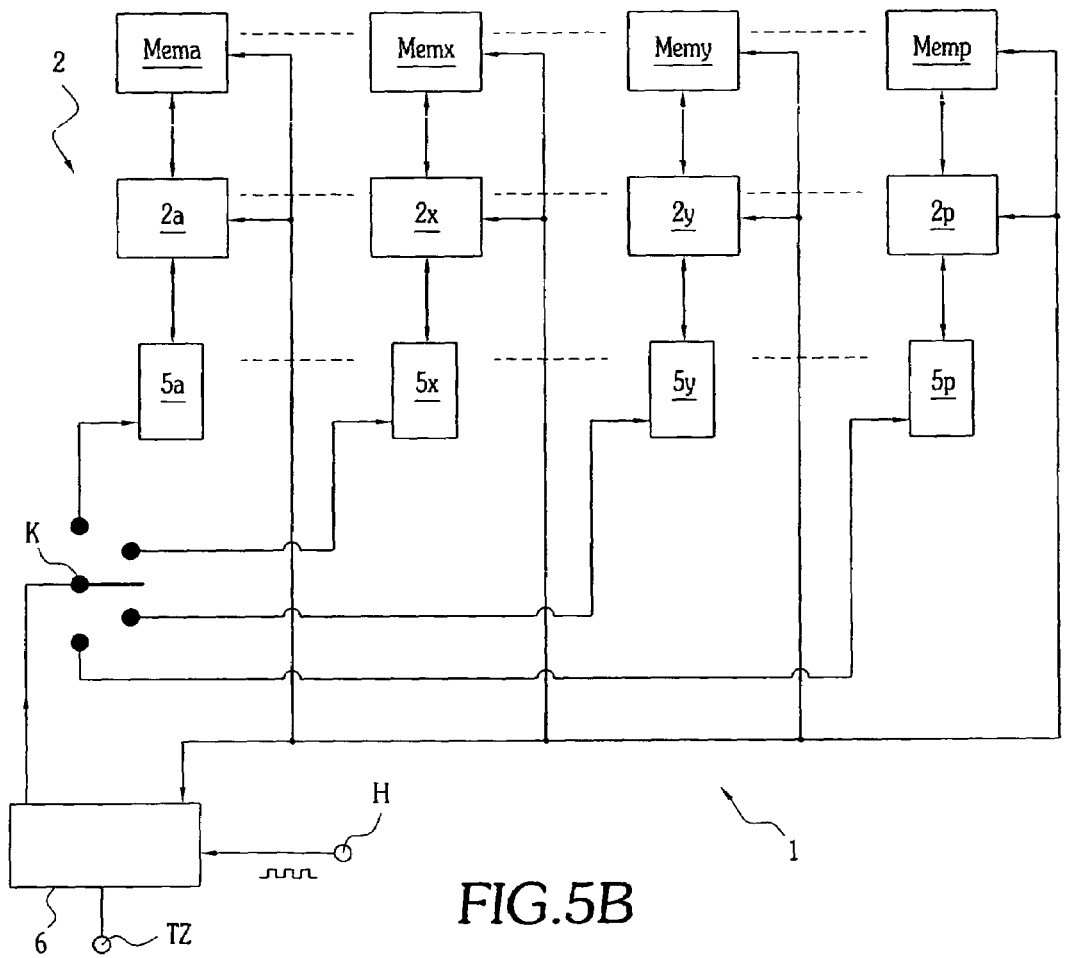

The flow chart of FIG. 5A illustrates the main steps of the process. During a first step, it is determined whether a new task is linked to a predetermined queue, i.e., whether it should be processed in a processor, or a processor group, associated with this queue. If the test is positive (the branch "YES"), the task is assigned to this particular queue 5x, for example (FIG. 5B). If the test is negative (the branch "NO"), the process for searching for and selecting a specific queue is initialized. This means the queue with the lightest load in the system 1, for example the queue 5y (FIG. 5B).

The search for this queue 5y is performed by a device 6, which could be logical or physical, as illustrated schematically by FIG. 5B.

It is assumed that the system 1 comprises a total of p queues: 5a, ..., 5x, ..., 5y, ..., 5p, each associated with (at least) one processor: 2a, ..., 2x, ..., 2y, ..., 2p. Each of the processors is associated with a memory Mema, ..., Memx, ..., Memy, ..., Memp. The device 6 scans the load of the queues 5a, ..., 5x, ... 5y, ... 5p.

Several processes can be used to determine the load of a particular queue set. Advantageously, in this variant of embodiment of the process of the invention, a queue's load is determined by taking into account both the utilization of the processor associated with the queue and the utilization of the memory associated with this processor. Thus, it is a composite load that corresponds to the following relation:

$$Load\_composite\#y = load\_CPU\#y + load\_Mem\#y \quad (1),$$

a relation wherein CPU#y is the processor or group of processors associated with the queue #y, and Mem#y is the memory associated with the processors.

The first term itself can be calculated through the multiplication of the following parameters: the load coefficient of the processor, which will be called coef_load_CPU#y, the number of tasks currently being executed, which will be called nb_task#y, and a parameter representing the average load of the processor per task, which will be called average_load_CPU#y per_task.

Likewise, for the second term, the calculation is performed from three similar parameters: coef_load_Mem#y, nb_task#y and average_load_Mem#y per_task.

The parameters coef_load_CPU#y and coef_load_Mem#y are weighted constants and average_load_CPU#y per_task and average_load_Mem#y per_task are variables calculated for each queue set.

It follows that the relation (1) can be rewritten in the following way:

$$Load\_composite\#y = nb\_task\#y * load\_FA\#y \quad (2),$$

a relation wherein load_FA#y is a variable datum stored in the queue structure and determined by the scheduler, for example every second, or by any other device or process activated regularly. This device could be the device 6, if the latter receives the appropriate clock signals H. The load is also calculated each time an execute statement is initiated.

The variable load_FA#y is a composite variable comprising constants (coef_load_CPU#y and coef_load_Mem#y) that can be stored in a global variable and are capable of being adjusted ("tunable") by the system administrator in order to obtain an optimum result. The other components of the variable load_FA#y are determined from several parameters describing the system, particularly from the number of executable tasks, from statistics kept up-to-date by the scheduler concerning the queues and the memory occupancy, etc. These statistics, for the most part, are generally available in modern computer systems and are used for purposes other than those specific to the invention.

The additional cost due to the arrangements specific to the invention, in terms of additional calculation time, is therefore negligible.

As more specifically concerns the calculations that make it possible to determine the load of a memory, it is possible to use well known methods that implement linear or non-linear estimation algorithms.

When a new task Tz is created, and once the queue with the lightest load had been found by the device 6, for example the queue 5y, the new task Tz is assigned to this queue by the device 6. This assignment is symbolized, in FIG. 5B, by a simple switch K.

These arrangements have many advantages, including the following:

a/ they make it possible to respond very rapidly to equally rapid changes in the behavior of the system 1;

b/ determining the composite load is simple, since it is based on two values that can be found in the same line of the "level 2" cache memory;

c/ the mechanism is not fixed; it can include other variables, for example the load balancing of input-output circuits ("I/O");

d/ the imbalance in the hardware modules is determined automatically (i.e., the number of processors and/or the memory size); in essence, the number of processors is determined by the fact that the parameter average_load_Mem#y per_task relates to one load per processor, and the memory size is determined by the fact that the number of pages (or similar entities) depends on the memory size; and e/ the mechanism adapts itself to the resource set; if there are several queues sharing the same storage pool, the load of the memory is the same for all the modules, and only the load of the processors is significant.

Experience has shown that the arrangements specific to this first variant of the second embodiment make it possible to improve the global performance of the system, even in presence of a large number of queues and tasks to be executed. However, under certain circumstances, the occurrence of instabilities may be observed. For example, if a curve representing the number of tasks executed per unit of time (for example per hour) is plotted as a function of the number of users of the system, these instabilities translate into oscillations of the curve.

Figure 8:
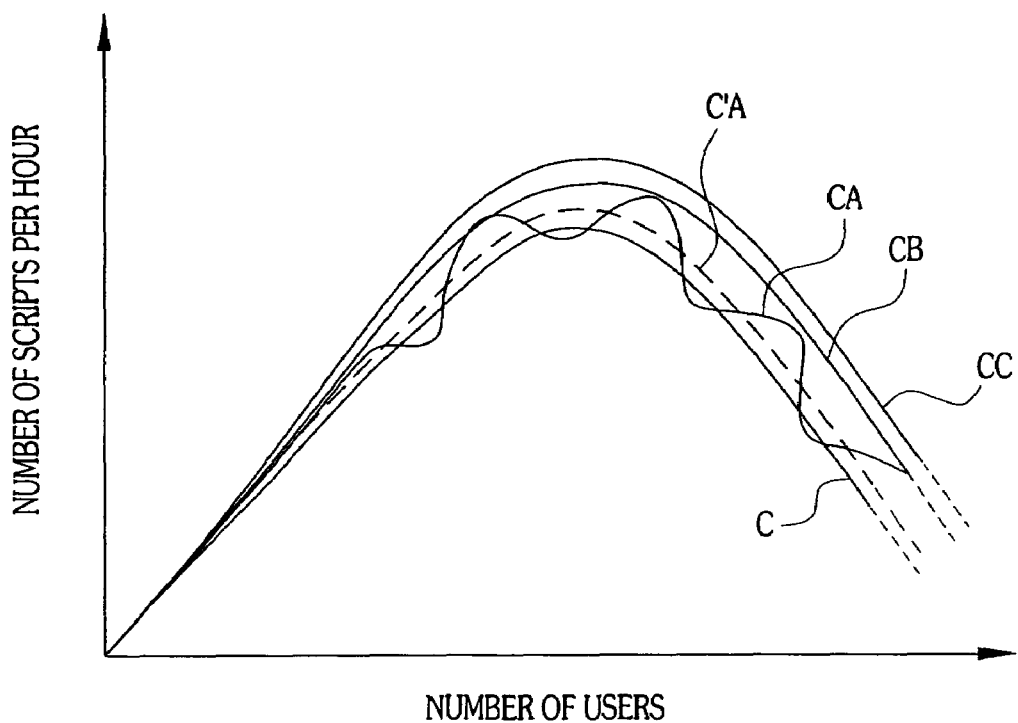
FIG. 8 is a curve that makes it possible to compare the performance obtained through the arrangements specific to these three variants of embodiment to that of the prior art.

FIG. 8 represents the appearance of the curve representing the changes in the number of tasks executed per hour (each task being represented, for example, by a script) as a function of the number of users of the system. The curve C represents the appearance of the performance of an unmodified system, i.e., a system of the prior art. The curve CA illustrates the operation of a system comprising the same computer resources, but in which the arrangements specific to the first variant of the second embodiment of the process of the invention have been implemented. It may be seen that the curve CA is (for the most part) located above the curve C, which indicates that the performance has been improved. But the curve CA oscillates around an average position (represented by an interpolation in broken lines CA). It may also be seen in the example of FIG. 8 that certain oscillations cause the curve CA to fall below the curve C. For these portions of the curve, the system does not perform as well as an equivalent system of the prior art.

Thus, it is preferable to use the second variant of the second embodiment of the process according to the invention, whose specific arrangements can be combined with those of the first variant.

According to this second variant of the second embodiment of the process according to the invention, when a processor determines that the queue associated with it is empty and has become inactive, it searches for another executable task in a remote queue that is not empty, or that at least has a load factor greater than a given threshold. However, the task selected cannot be just any task. It must meet certain criteria, which will be indicated below.

Figure 6A:
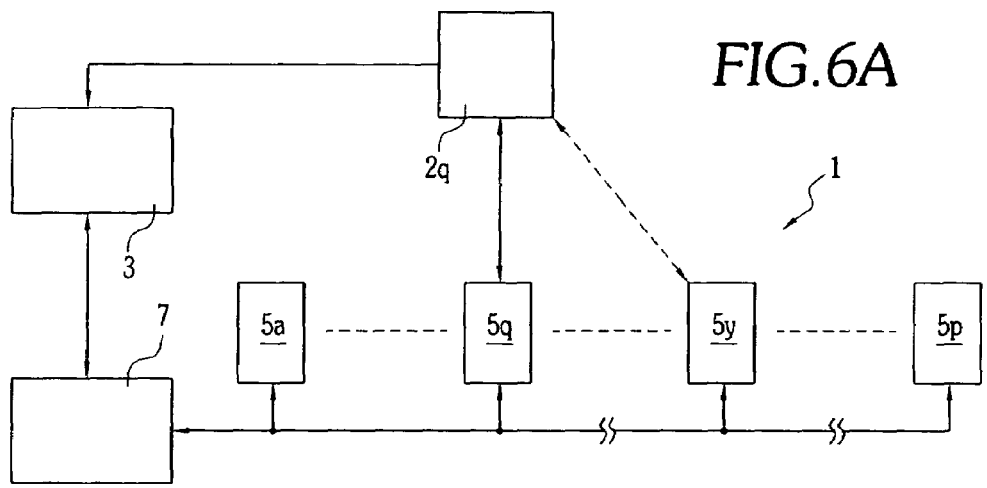
FIG. 6B is a flow chart explaining the process of the invention according to a second variant of the second embodiment of the invention and FIG. 6A schematically illustrates an architecture for implementing this variant.

FIG. 6A schematically illustrates one possible method for searching for a task in the queues of the system 1. The elements common to the preceding figures have the same references, and will be re-described only as necessary.

Normally, as shown in connection with FIG. 4, the processors send requests received by the "dispatcher" 3. It is assumed here that the queue 5$q$ of the processor 2$q$ is empty and that it has become inactive. The "dispatcher" 3 receives a processing request issued by this processor 2$q$. According to the second variant of the second embodiment of the process, a device 7, which can be physical or logical, is provided for scanning the state of the various queues of the system 1, or the total of p queues: 5$a$, . . . 5$q$, . . . 5$y$, . . . 5$p$.

Figure 6B:
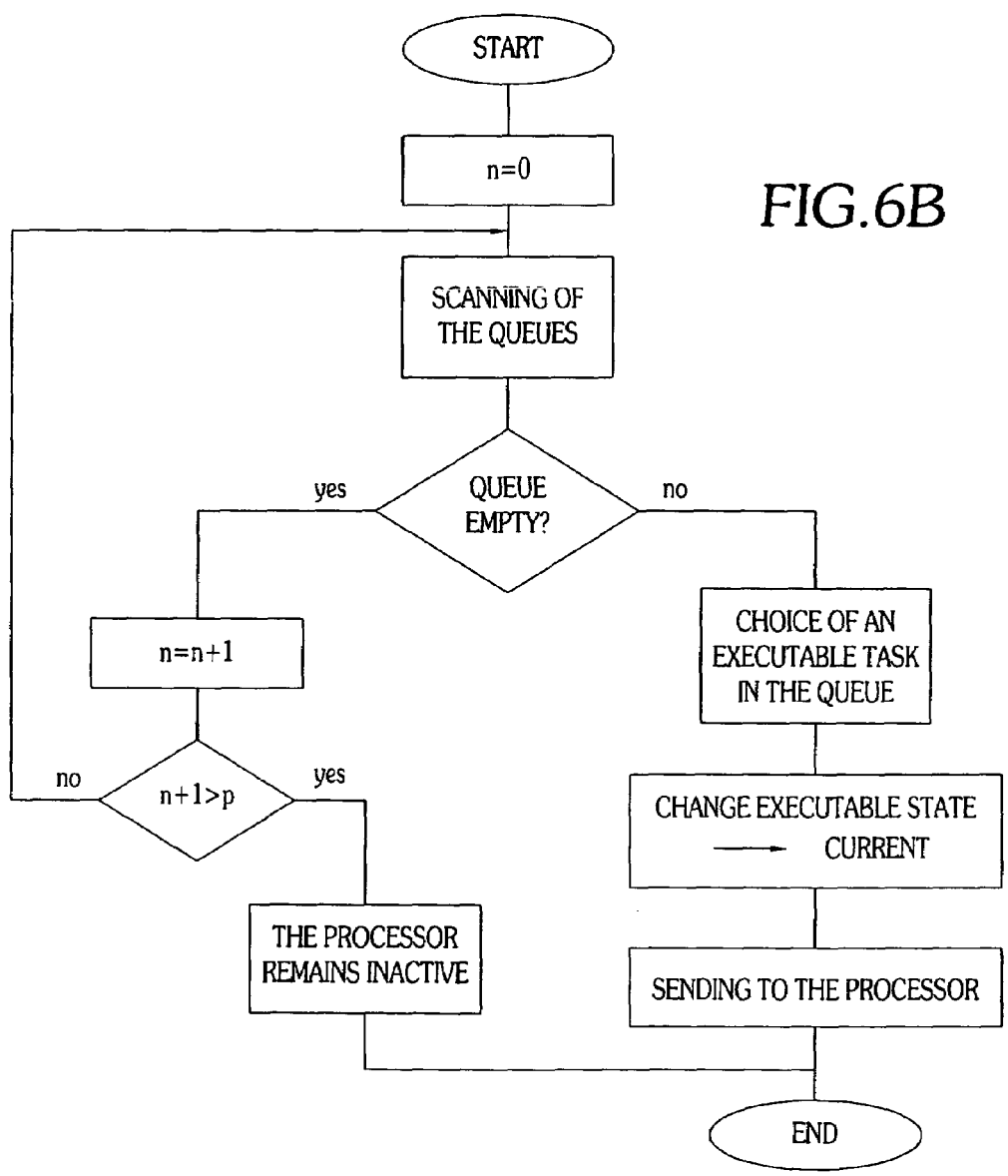

The process for searching for an executable task comprises several steps, schematically summarized by the diagram in FIG. 6B. The first step consists of scanning the queues one by one (starting, for example, with the queue having the arbitrary rank n=0). For each queue, a test is performed to see whether or not the queue is empty. If the queue is empty, the scanning is re-executed, after an incrementation of the number of the queue, n=n+1, and a check to see whether there are queues remaining to be scanned (test: n+1>p). When the test is positive, it means that there is no empty queue, and the scanning ends. The processor then remains inactive until the occurrence of an event (clock top, enqueuing of a task into the queue).

When the device 7 finds a non-empty queue, for example the queue 5$y$ (FIG. 6B), it performs a step for selecting one of the tasks present in the queue, based on criteria that will be explained.

Likewise, the choice of the queue can be made based not on the simple fact that it is empty, but preferably on a given minimal occupancy threshold criterion, as will also be shown.

The process according to this second variant has three problems, which are the following:
 a/ the determination of a specific criterion for deciding whether a processor 2$q$ should "aid" a remote queue 5$y$;
 b/ the management or the lock mechanism associated with the queue 5$y$; and
 c/ the selection of a specific task in this queue 5$y$.

When it comes to the "aid" decision, the execution of a task assigned to a remote queue must not interfere with the operation of the cache memories of the system and degrade the global performance of this system, which would run counter to the object of the invention. Consequently, the mechanism for reassigning tasks cannot be implemented systematically, at least not without certain precautions.

It is necessary for certain criteria to be met, among which are:
 a/ the average load factor of the processor must be less than a given threshold, for example typically 50%;
 b/ the average load factor per processor of the "aided" queue set must be greater than a given threshold, for example typically equal to 110%; and
 c/ the instantaneous processor load of the "aided" queue set must be greater than a given threshold.

These criteria must be taken into account in the process for selecting a queue and a specific task from this queue.

Furthermore, it must be noted that certain events can cause the re-assignment operation to be aborted:
 1/local tasks need to be executed;
 2/the lock of the selected queue cannot be acquired;
 3/the selected task is no longer executable when the lock is acquired; and
 4/no executable task can be found.

The average load and instantaneous load parameters can be calculated by the device 7.

When it comes to the management of a critical lock, it is important to note that it should be held for as short a time as possible, even if the performance of the process for searching for a task is diminished from the point of view of the local processor. The lock on a queue is more critical than the lock on a task in this queue.

Consequently, the process advantageously comprises the following steps:
 going into the unlocked queue to select an executable task;
 locking the selected task in this queue;
 locking the "aided" queue, taking care to provide a "time-out" in order to avoid a "deadlock";
 checking to determine whether the task is still in the executable state;
 extracting this task from the queue;
 unlocking the queue; and
 dispatching the task in the usual way.

When it comes to the choice of a task, a great number of factors must be taken into account, including the following:
 1/the affinity with a processor, i.e., the fact that the last dispatching of the task was to this processor;
 2/the affinity with a module, in the case of a "NUMA" type of architecture, i.e., the fact that the last dispatching of the task was to this module;
 3/the priority assigned to a task;
 4/the location of the task;
 5/the fact that the task has already been "aided";
 6/the fact that the process is "single-task";
 7/the amount of memory accessed by the task;
 8/the utilization of the processor; and
 9/the duration of the task.

When it comes to factor 3/(priority), it is preferable to "skip" the tasks with the highest priority, i.e., the first tasks in the "aided" queue. In essence, there is a high probability that they will be handled by a local processor, precisely because of the high priority associated with them, before they can be processed by the remote processor. The utilization of a predetermined threshold seems to be an appropriate solution for this part of the process. Furthermore, the lowest priority tasks, based on statistical averages, are generally tasks that use the processor the most.

The determination of a threshold value is important. In essence, if the threshold value is too low, i.e., if the number of skipped tasks is too low, the aid mechanism will often be in conflict with the standard task distribution mechanism, i.e., the mechanism common to the prior art. On the other hand, if the threshold is set at a value that is too high, no task will be found and the aid mechanism will prove completely ineffective.

Preferably, in order to be as independent as possible from the workload, a self-adapting process is implemented, for example the following:
 The number of skipped tasks is set at a value between the number of processors and the number of executable tasks in the queue set. This value is incremented by one unit each time the task chosen to be "aided" is either already locked, or not in the executable state. This value is decremented by one unit each time no task is found, when the maximum number of tasks to be scanned is greater than half the number of executable tasks.

The maximum number of tasks to be scanned is set at a value between one unit and the number of executable tasks in the queue set. This value is incremented by ne unit each time no task is found or each time the task chosen is in the last quarter of the scanned tasks (the lowest priority tasks). This value is decremented by one unit each time the task chosen is in the first quarter of the tasks scanned (the highest priority tasks).

Factor 4/(location) is, a priori, a very important factor. However, this factor is generally difficult to determine even though, in a "UNIX" type environment, the location of the task by storage segment is known.

As for factor 5/, it can generally be acknowledged that, if a task has already been "aided," it may already reside in several modules. It follows that moving it elsewhere does not constitute a costly operation in terms of a degradation in performance.

Factor 7/is also an important factor, but it is not easy to determine. Two criteria make it possible to arrive at a reasonable approximation:
  a/ the memory size used by the process; and
  b/ the "interactivity" of the task, this criterion being defined by the fact that a task may or may not be frequently "dormant."

Criterion b/ can be obtained by counting the number of times in which it is in the "dormant" state, which can be derived from generally available statistics.

Finally, when it comes to factor 9/, it is easy to see that it is useless to attempt to handle the tasks of short duration. In essence, most of them disappear quickly.

Taking into account all or some of these different factors, it is possible to determine which task should be selected in a queue, by defining an individual cost associated with each factor, and thereby deducing a global cost associated with a particular task. To do this, it is possible to construct a table with two dimensions: factors and costs. The task having the lowest global cost, i.e., the one that causes the least degradation of the performance of the system, is selected. The calculations necessary to this determination and to that of the above-mentioned threshold for skipping a predetermined number of tasks can be performed by the device 7, alone or in cooperation with other components of the system.

Referring again to FIG. 8, this results in the obtainment of the curve CB, which always remains above the curve C and does not have any further oscillations. The second variant of the second embodiment of the process therefore makes it possible to improve the global performance of the system.

However, the first and second variants actually allow an increase in the global performance of the system only as long as new tasks are being created. When the process for creating tasks substantially subsides, an imbalance of the loads of the queues is again observed. This is the case, for example, at the system's end-of-job.

Thus, a third variant of the second embodiment of the process according to the invention can be implemented.

In the first two variants, the "task-queue" associations remain invariable. According to this third variant of embodiment, which can be combined with the other two, the tasks are physically reassigned by being moved between queues.

Figure 7:
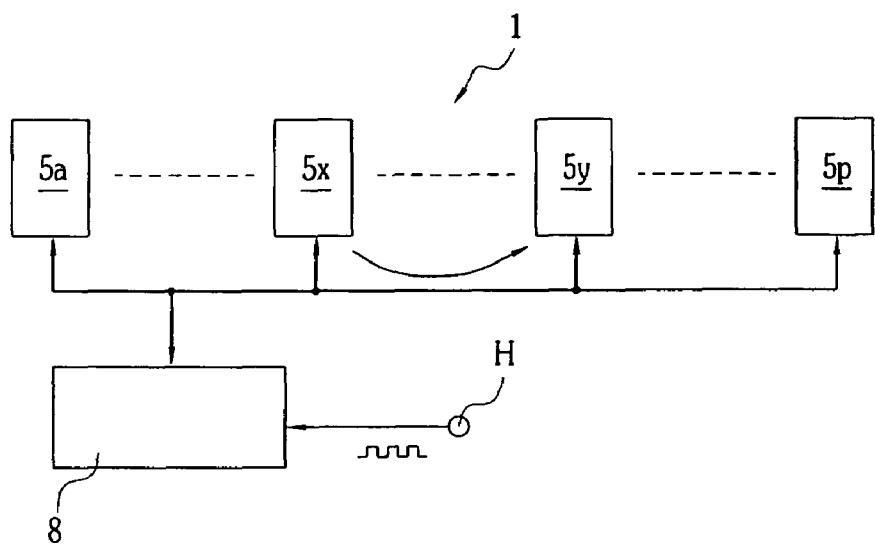
FIG. 7 schematically illustrates an architecture for implementing a third variant of the second embodiment of the process of the invention.

FIG. 7 schematically illustrates this third variant. A physical or logical device 8 is provided for determining whether the system is unbalanced in terms of the loads of the queues $5a, \ldots, 5x, \ldots, 5y, \ldots, 5p$. The mechanism is activated periodically, for example every second, by the scheduler or any other device that supplies clock signals H.

When an imbalance is determined by the device 8, the tasks of the queues $5a, \ldots, 5x, \ldots, 5y, \ldots, 5p$ are redistributed in order to try to find a new equilibrium.

In practice, and preferably, only the tasks belonging to the queue with the heaviest load, arbitrarily $5x$, will be moved. Moreover, also preferably, a predetermined imbalance threshold, below which no re-balancing is performed, is also considered.

Also preferably, not just individual tasks, but all the tasks belonging to the same process are moved. In essence, based on statistical averages, tasks belonging to the same process are likely to cooperate with one another. It is therefore appropriate to move them globally.

Finally, in order to minimize the cost of the re-balancing, the work load of the multitask processes and the required memory size are measured. The process that has the heaviest work load and requires the least memory size is moved to the queue with the lightest load.

More precisely, the main steps of this third variant are the following:

1/ determining the composite load vector for each queue set, or $\overline{CL}$;

2/ determining the average composite load vector, or $\overline{ACL}$;

3/ determining the imbalance vectors for each queue set i, or $\overline{AD_i}$;

4/ determining the queue having the greatest imbalance vectors, or $\|\overline{AD_i}\|$ 5/ determining the average number of tasks that can be migrated, or ANT, and 6/ determining the size of the sphere of a process than can be migrated, or SSMP.

To illustrate the concept, the value of SSMP can be determined as follows:

a/ if ANT=1, then SSMP=$\|\overline{AD_i}\|$/2; and b/ if ANT>1, then SSMP=$\|\overline{AD_i}\|$*1, 1*(ANT−1)/ANT c/ if the value of SSMP is below a predetermined threshold, the re-balancing operation is abandoned; the system is not considered to be unbalanced.

For each process, the following steps are executed:

checking for the possibility of migration: in other words, checking to see whether the process belongs to the queue set with the heaviest load, whether all of the tasks that compose it belong to this same set and whether any task is linked to a particular module (generally to one of the processor groups);

determining its composite load vector, i.e.:

if $\|\overline{CLP-AD}\|$<SSMP, determining the cost of the migration;

saving the process in a list of processes ANT to be migrated, these processes being sequenced in descending order of the ratio ($\|\overline{CLP-AD}\|$/cost);

a new determination of the composite load (as a function of the time elapsed, the latter possibly having changed since the first determination) and of the imbalance of the queue set; and for each process of the list of processes that can be migrated:

if $\|\overrightarrow{CLP-AD}\|<\|\overrightarrow{AD}\|$ finding the queue with the arbitrary subscript y for which the parameter $\|\overrightarrow{CLP-AD}\|$ is minimal;

migrating this process to the queue set with the lightest load 5y;

updating the factor representing the imbalance of the two queue sets, i.e., $\overrightarrow{AD_x}=\overrightarrow{AD_x}-\overrightarrow{CLP_x}$ and $\overrightarrow{AD_y}=\overrightarrow{AD_y}-\overrightarrow{CLP_y}$.

The composite load vector is a three-dimensional vector. In essence, it depends on the following parameters:

load of the processor;
load of the memory; and
priority.

The first two parameters in turn depend on the precise hardware and software configuration of the system in question: number of processors, size of the memory, number of available pages, etc. The determination of these parameters is common to the prior art and obtained through standard calculations, well known to one skilled in the art. The "priority" parameter is obtained from the average of the priorities attached to the various tasks.

Theoretically, the determination of the load of a queue set is given by the sum of the loads of the processes. But to accelerate this determination, it is derived directly from statistics generally stored in the data structure of this set. Again, the load depends on three parameters: load of the processor, load of the memory, and priority.

The determination of the average composite load can be obtained from the following relation:

$$\overrightarrow{ACL} = \frac{\sum_{i=1 \grave{a} p} \overrightarrow{CL_i}}{p} \quad (3)$$

a relation wherein [ ] is the composite load of the $i^{th}$ queue set and p is the total number of queue sets.

The average imbalance can be determined from the following relation:

$$\overrightarrow{AD_i} = \frac{\overrightarrow{AD_i} + (\overrightarrow{CL_i} - \overrightarrow{ACL})}{2} \quad (4)$$

The determination of the cost associated with a migration operation can be obtained by considering that the chief cost is due to the migration of pages in an environment of the "UNIX" type (or to access to remote pages), and to the cost linked to the movement of a task from one queue set to another.

An approximation of the estimate of the cost is obtained directly from the number of pages associated with the process and from the number of tasks that must be moved. In an environment other than the "UNIX" environment, the "page" entity must be replaced by an equivalent entity.

These methods for determining the parameters involved are indicated only as examples, in order to illustrate the concepts. Other alternatives exist and are within the capability of one skilled in the art.

Referring again to FIG. 8, the curb CC schematically illustrates the appearance of the improvement in performance relative to the prior art (curve C). However, experience has shown that generally, the improvement obtained is not as great as that obtained by the second variant. This is essentially due to the fact that the physical movement of the tasks between queues involves a non-negligible cost, even if it is not generalized in accordance with the preferred arrangements just described, but on the contrary, is selective. This variant of the process according to the invention is reserved for an architecture of the "NUMA" type, since in the case of a standard "NUMA" type architecture, the improvement in performance is insignificant, while its implementation requires modifications of the operating system and the presence of additional physical or logical devices (FIGS. 7: 8).

With the reading of the above, it is easy to see that the invention clearly achieves the objects set forth.

It should be clear, however, that the invention is not limited to just the exemplary embodiments explicitly described, particularly in relation to FIGS. 2 and 4 through 8.

In particular, the numerical values, for example the number of queues, are indicated only to better illustrate the concepts. They essentially depend on the precise application intended.

Likewise, the precise methods for determining and calculating the various parameters mentioned in the description could be adapted without going beyond the scope of the invention.

Finally, although the process has been described in detail within the framework of a "UNIX" environment and an architecture of the "NUMA" type; the process according to the invention, as indicated previously, is not in any way limited to these particular applications.

The invention may be applied to other types of multiprocessor architectures wherein the operating system is of the preemptive type.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A process for assigning tasks to a processor in a multiprocessor digital data processing system having a preemptive type operating system and a given number of processors capable of processing said tasks in parallel, comprising:

in at least one preliminary phase, dividing said given number of processors into a plurality of processor groups, each of the plurality of processor groups comprising a number of processors;

creating a plurality of elementary task queues;

associating each of the plurality of elementary task queues with a different one of the plurality of processor groups;

storing a plurality of tasks to be processed in one of the plurality of elementary task queues, wherein the plurality of tasks are stored in a given order of priority; and assigning each of the plurality of tasks to one of the given number of processors in the associated processor group.

2. A process according to claim 1, wherein said plurality of processor groups each comprise an identical number of processors.

3. A process according to claim 1, additionally comprising generating a series of tests and measurements in an additional preliminary phase for determining the number of processors in each processor group and the number of groups for achieving the best performance of said system.

4. A process according to claim 1, wherein said system is of the non-uniform memory access type (NUMA), and the system comprises a predetermined number of modules linked to one another, wherein each module comprises one of the plurality of processor groups and storage means, and wherein each of said modules is associated with one of said elementary task queues.

5. A process according to claim 1, further comprising associating each of said processors with a first data structure for identification of the associated processor, said first data structure comprises at least one first set of pointers, associating said first set of pointers with one of said elementary task queues, associating each of said elementary task queues with a second data structure, said second data structure having at least one second set of pointers, associating said second data structure with one of said plurality of processor groups, storing all of the tasks to be processed in said system in a table, each of said second data structures of the elementary task queues further comprising a third set of pointers, said third set of pointers each associating elementary task queues with one of said tasks stored in the table or with a series of concatenated tasks, and associating each of said tasks of the table with a third data structure that comprises a fourth set of pointers said fourth set of pointers associating said third data structure with one of said elementary task queues.

6. A process according to claim 1, further comprising distributing said tasks among said plurality of elementary task queues in at least one additional phase by searching, when a new task to be processed is created, for a queue with the lightest load among all of said elementary task queues of said system and assigning said new task to said elementary task queue with the lightest load so as to balance a global load of said system among said elementary task queues.

7. A process according to claim 6, further comprising performing said distribution of tasks by determining a composite load parameter associated with each of said elementary task queues associating each processor with a memory, calculating said composite load parameter as the sum of the load of a processor or a processor group associated with said elementary task queue and the load of the memory associated with said processor or processor group.

8. A process according to claim 6, further comprising checking in a preliminary step whether said new task is linked to one of said elementary task queues, and when said test is positive, assigning said linked task to the elementary task queue.

9. A process according to claim 1, further comprising at least one additional phase of searching for a remote elementary queue that is not empty when one of said elementary task queues associated with one of said processor groups is empty of executable tasks selecting in said not empty remote elementary queue a task executable by one of said processors of said processor group associated with the empty elementary queue and transmitting said selected task to said one of said processors for processing so as to globally balance the processing of said tasks in said system.

10. A process according to claim 9, wherein said non-empty elementary task queue has a predetermined minimal occupation threshold.

11. A process according to claim 10, further comprising storing the tasks in decreasing order of priority, skipping a predetermined number of tasks before scanning the other tasks of said non-empty elementary task queue in order to search for an executable task and have said executable task processed by one of said processors of said processor group associated with the empty elementary task queue.

12. A process according to claim 11, wherein said number of skipped tasks and the maximum number of scanned tasks among all tasks stored in said non-empty elementary queue are variable over time and are determined by a self-adapting process from the number of tasks that are or are not found during said scans and from the position of these tasks, sequenced in order of priority, in said nonempty elementary queue.

13. A process according to claim 9, wherein said selected task is associated with a minimal value of a cost parameter, which measures global performance degradation of said system due to the processing of said selected task in said non-empty remote elementary queue by one of said processors of said processor group associated with the empty elementary queue.

14. A process according to claim 1, further comprising periodically measuring for a balanced distribution of said tasks in said elementary task queues in at least one additional phase and when an unbalanced state of said system is determined, selectively moving tasks from at least one task elementary queue with a heavier load to an elementary task queue with a lighter load.

15. A process according to claim 14, further comprising discontinuing the step of selectively moving tasks when said imbalance is below a certain threshold.

16. A process according to claim 14, wherein all or some of said tasks belong to multitask processes, and each multitask process requires a given memory size and workload, further comprising measuring workloads and memory sizes in the system and selecting the process requiring the greatest workload and the smallest memory size, and moving all the tasks of said selected process to the elementary queue with the lightest load.

17. A process according to claim 16, further comprising a preliminary step of checking whether all tasks of said multitask process that must be moved belong to the elementary task queue set with the heaviest load and whether any task is linked to any of said processor groups.

18. A process according to claim 1, wherein said preemptive operating system is used in a server in a distributed network environment.

19. Architecture for a multiprocessor digital data processing system, comprising a given number of processors, for implementing a process for assigning tasks to be processed to said processors, said system having a preemptive operating system and said given number of processors capable of processing said tasks in parallel, said processors being divided, in a preliminary phase, into groups of processors;
   wherein, an elementary task queue is subsequently created and associated with each of the groups of processors; and
   each of said elementary task queues stores a plurality of tasks to be processed in a given order of priority, so that each of the stored plurality of tasks of each of said elementary task queues is associated with one of the processors in the group of processors associated with the elementary task queue.

20. Architecture according to claim 19, further comprising means for determining the load of said elementary task queues and for assigning a new task created in said system to the elementary task queue with the lightest load.

21. Architecture according to claim 19, further comprising, when one of said elementary task queues associated with one of said processors is empty, means for locating non-empty, remote elementary task queue and an executable task in said non empty elementary task queue, and assigning said executable task to said one of said processors for processing said executable task.

22. Architecture according to claim 19, further comprising means for detecting an imbalance between elementary task queues, and for determining when an imbalance is detected the elementary task queue with the heaviest load and the elementary task queue with the lightest load, and means for moving tasks from the elementary task queue with the heaviest load to the elementary task queue with the lightest load.

23. Architecture according to claim 19, wherein the operating system of the processing system is of the nonuniform memory access type (NUMA), and comprises modules linked to one another, each module comprising a given number of processors and storage means, each of said modules constituting one of said groups, each of said modules being associated with one of said elementary queues.

24. Architecture according to claim 20, wherein the operating system of the processing system is of the nonuniform memory access type (NUMA), and comprises modules linked to one another, each module comprising a given number of processors and storage means, each of said modules constituting one of said groups, each of said modules being associated with one of said elementary queues.

25. Architecture according to claim 21, wherein the operating system of the processing system is of the nonuniform memory access type (NUMA), and comprises modules linked to one another, each module comprising a given number of processors and storage means, each of said modules constituting one of said groups, each of said modules being associated with one of said elementary queues.

26. Architecture according to claim 22, wherein the operating system of the processing system is of the nonuniform memory access type (NUMA), and comprises modules linked to one another, each module comprising a given number of processors and storage means, each of said modules constituting one of said groups, each of said modules being associated with one of said elementary queues.

* * * * *

UNITED STATES PATENT AND TRADEMARK OFFICE
CERTIFICATE OF CORRECTION

PATENT NO. : 6,993,762 B1
DATED : January 31, 2006
INVENTOR(S) : Rogier Pierre

It is certified that error appears in the above-identified patent and that said Letters Patent is hereby corrected as shown below:

<u>Title page,</u>
Item [57], ABSTRACT,
Line 2, delete "having" and replace with -- with --.
Line 4, delete "the process" and replace with -- this process --.

<u>Column 19,</u>
Line 9, delete "of said modules" and replace with -- module --.
Line 55, delete "in said not empty remote elementary" and replace with -- in said empty task elementary --.
Line 58, insert -- task -- between "elementary" and "queue".

<u>Column 20,</u>
Line 10, delete "nonempty" and replace with -- non-empty --.

<u>Column 21,</u>
Line 18, delete "each of said modules" and replace with -- each module --.

<u>Column 22,</u>
Lines 3, 11 and 19, delete "each of said modules" and replace with -- each module --.

Signed and Sealed this

Sixteenth Day of May, 2006

JON W. DUDAS
*Director of the United States Patent and Trademark Office*